United States Patent
Liang et al.

(10) Patent No.: US 8,601,070 B2
(45) Date of Patent: Dec. 3, 2013

(54) METHOD AND APPARATUS FOR INDIVIDUALIZING NICKNAMES IN MESSAGE

(75) Inventors: Gang Liang, Shenzhen (CN); Lingyan Wu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 75 days.

(21) Appl. No.: 12/343,184

(22) Filed: Dec. 23, 2008

(65) Prior Publication Data

US 2009/0106383 A1    Apr. 23, 2009

Related U.S. Application Data (63) Continuation of application No. PCT/CN2007/070184, filed on Jun. 26, 2007.

(30) Foreign Application Priority Data

Jun. 28, 2006   (CN) .......................... 2006 1 0061391
Dec. 4, 2006    (CN) .......................... 2006 1 0162677

(51) Int. Cl.
*G06F 15/16* (2006.01)

(52) U.S. Cl.
USPC ........................................................ 709/206

(58) Field of Classification Search
USPC ........................................................ 709/206
See application file for complete search history.

(56) References Cited

U.S. PATENT DOCUMENTS

| | | | |
|---|---|---|---|
| 6,298,128 B1 | 10/2001 | Ramey et al. | |
| 6,816,884 B1 | 11/2004 | Summers | |
| 7,783,741 B2 * | 8/2010 | Hardt | 709/224 |
| 7,856,090 B1 * | 12/2010 | Satish | 379/93.01 |
| 2002/0039915 A1 * | 4/2002 | Hama et al. | 455/566 |
| 2002/0087641 A1 * | 7/2002 | Levosky | 709/206 |
| 2003/0126218 A1 | 7/2003 | Sakonsaku | |
| 2004/0015547 A1 * | 1/2004 | Griffin et al. | 709/204 |
| 2004/0201625 A1 * | 10/2004 | Karamchedu et al. | 345/752 |
| 2004/0215479 A1 * | 10/2004 | Dorsey et al. | 705/1 |

(Continued)

FOREIGN PATENT DOCUMENTS

| | | |
|---|---|---|
| CN | 1343417 A | 4/2002 |
| CN | 1430154 A | 7/2003 |

(Continued)

OTHER PUBLICATIONS

International Preliminary Search Report issued in corresponding PCT Application No. PCT/CN2007/070184; issued Jan. 6, 2009.
Office Action issued in corresponding European Patent Application No. 07 764 122.3; issued May 28, 2009.

(Continued)

*Primary Examiner* — Tauqir Hussain
(74) *Attorney, Agent, or Firm* — Brinks Hofer Gilson & Lione (57) ABSTRACT

A method for individualizing message nicknames is provided. The method includes creating a nickname conversion table that contains a message address and the corresponding nicknames; receiving messages, converting the sender nickname or recipient nickname in the message according to the nickname conversion table; and sending the converted message out. An apparatus for individualizing message nicknames is also provided. The method and apparatus enable a user to set individualized nickname information; the nickname information can be shared by multiple terminals of a user uniformly, and can be stored in a server securely and reliably. A message server and terminal are also provided.

6 Claims, 6 Drawing Sheets

(56) References Cited

U.S. PATENT DOCUMENTS

| | | | |
|---|---|---|---|
| 2005/0198175 A1* | 9/2005 | Thomas et al. | 709/206 |
| 2006/0136561 A1* | 6/2006 | Lee | 709/206 |
| 2009/0210505 A1* | 8/2009 | Thomas et al. | 709/206 |

FOREIGN PATENT DOCUMENTS

| | | |
|---|---|---|
| CN | 1493037 A | 4/2004 |
| CN | 101098503 B | 8/2012 |
| JP | 2002-152246 | 5/2002 |
| WO | 2005/039130 A1 | 4/2005 |

OTHER PUBLICATIONS

Supplementary European Search Report issued in corresponding European Patent Application No. 07764122.3; mailed May 12, 2009.
International Search Report issued in corresponding PCT Application No. PCT/2007/070184; mailed Oct. 25, 2007.
Jeong, Wook-Hyun, *Conversion of Display Names at Reception.* Open Mobile Alliance. Mar. 26, 2006. 2 pages.
Office Action issued in corresponding Chinese Patent Application No. 200610162677.0, mailed Feb. 13, 2012.
Office Action issued in corresponding Chinese Patent Application No. 200610162677.0, mailed Mar. 8, 2011.

* cited by examiner

METHOD AND APPARATUS FOR INDIVIDUALIZING NICKNAMES IN MESSAGE

RELATED APPLICATIONS

This application is a continuation of International Application No. PCT/CN2007/070184, filed on Jun. 26, 2007, which claims a priority from (i) the Chinese Patent Application No. 200610162677.0, filed with the Chinese Patent Office on Dec. 4, 2006, and entitled "Method and Apparatus for Individualizing Message Nicknames"; and (ii) the Chinese Patent Application No. 200610061391.3, filed with the Chinese Patent Office on Jun. 28, 2006, and entitled "Method and Apparatus for Individualizing Email Nicknames", the contents of which are incorporated herein by reference in their entirety.

FIELD OF THE DISCLOSURE

The present disclosure relates to the mobile communication field, and in particular, to a method and an apparatus for individualizing nicknames in a mobile message service.

BACKGROUND

Message services include: Short Message Service (SMS), Multimedia Short message (MMS), instant message, and Converged IP Message (CPM). The message services such as instant message and CPM are based on the Session Initiation Protocol (SIP) technology, and belong to the presence-based individual-to-individual, individual-to-application, and individual-to-group mobile data services of the message type.

The existing message service engines such as SMS, MMS, IM, Push-to-talk Over Cellular (PoC) are separately designed and standardized. Each service provides a single type of user experience, and is limited to a certain medium and application. CPM is a SIP-based message service that integrates the multimedia conference. By using the presence features and a single CPM platform, the CPM service provides user experience of multiple existing message-type services, enables a user to enjoy the same user experience on different devices, and ensures interworking with various existing message services.

With the development of the mobile communication technology, the Internet applications are extended to the mobile application field. The $3^{rd}$ Generation (3G) mobile communication technology speeds up the integration between the telecom network and the Internet, and the penetration of the Internet applications into the mobile networks extends the service capabilities of the mobile networks, while the inherent features of the mobile network impose new requirements for such applications. The Email service is an important service in the Internet applications. The mobile email service is an extension from the traditional Internet email, and enables the user to edit incoming and outgoing emails on a mobile terminal, and can be seamlessly integrated with the email services of the Internet.

In the existing message service field, the general format of a message address is: nickname <communication address>.

Example 1

Header of an Email

Message-id: 123456789;
Subject: Spring Festival;
From: Zhang Qiang <zhangqiang@xxx.com.cn>;
To: Zhang San <zhangsan@kkk.com.cn>;
...

Example 2

Header of a Sip-Based Message Such as Instant Message and CPM

MESSAGE sip: zhangqiang@xxx.com.cn SIP/2.0
Via: SIP/2.0/TCP user1pc.xxx.com.cn; branch=z9hG4bK776sgdkse
Max-Forwards: 70
From: Zhang Qiang <sip : zhangqiang@xxx.com.cn>;tag=49583
To: Zhang San < sip : zhangsan@kkk.com.cn>
...

In the previous examples, "Zhang Qiang" and "Zhang San" are nicknames displayed to the user; "Zhang Qiang" is the nickname of the message sender, and "Zhang San" is the nickname of the message recipient.

In the current practice of a nickname, if the message sender sets a default nickname of sending messages on the terminal, the sender name in the message sent by the user will be the set default nickname; if no default nickname is set, the sender name in the message sent by the user will be message address of the sender. The nickname of the recipient is generally set in the address book of the terminal. The user can also set the sender nickname of a received message on the terminal. If no sender nickname is set, the sender nickname of the received message will be displayed as the nickname in the received message.

The inventor discovers at least the following weaknesses in the prior art: a message sender can have only one nickname, and all recipients would receive message with the same nickname, which makes it impossible to set different nicknames displayed to different recipients.

SUMMARY

The embodiments of the present disclosure provide a method for individualizing nicknames in a message system, an apparatus for individualizing nicknames in a message system, a message server and a terminal.

A method for individualizing message nicknames, includes:
 creating a nickname conversion table that contains message addresses and the corresponding nicknames;
 receiving messages, converting the sender name in the message according to the nickname conversion table; and sending the converted message out.

An apparatus for individualizing message nicknames, includes:
- a nickname storing module, adapted to store the nickname conversion table; and
- a nickname converting module, adapted to convert the nickname for the message according to the nick conversion table.

A message server, includes:
- a message transceiver module, adapted to receive messages and send the messages converted by the nickname conversion apparatus; and
- a nickname conversion apparatus, adapted to convert the nickname for the received message.

A terminal, includes:
- a message transceiver module, adapted to receive messages and send the messages converted by the nickname conversion apparatus;
- a nickname conversion apparatus, adapted to convert the nickname for the received message; and
- a man-machine interface module, adapted to transfer the message input by the user to the message transceiver module, and display the message received from the message receiving & sending module to the user.

The embodiments of the present disclosure enable the user to set individualized nickname information, thus displaying different sender nicknames to different recipients; if being stored in a server, the nickname information is secure and reliable and enables multiple terminals of the user to share uniform nickname information.

DETAILED DESCRIPTION

In order to help a skilled person better understand the technical solution, the present disclosure is hereinafter described in detail with reference to embodiments and accompanying drawings.

Figure 1:
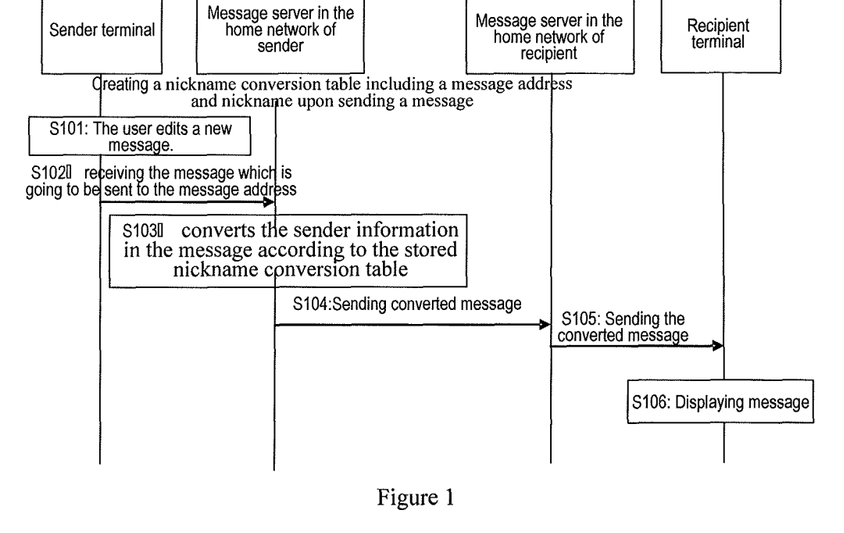
FIG. 1 is a flowchart of converting a message nickname in an embodiment of the present disclosure.

FIG. 1 is a flowchart of converting a message nickname in an embodiment of the present disclosure. The system for implementing this function includes:

- a sender terminal, adapted for the user to edit a message, and send the message to the message server in home network, wherein the sender terminal may be a mobile station;
- a message server in home network of the sender, adapted to: receive the message that comes from the terminal for being sent, convert the nickname for the message, and send the converted message to the message server in home network of the recipient;
- a message server in home network of the recipient, adapted to: receive a message from the message server in home network of the sender, convert the nickname for the message, and send the converted message to the receiving message; and
- a recipient terminal, adapted to receive a message from the message server in home network, and display the message to the user, wherein the recipient terminal may be a mobile station.

In this embodiment, a nickname is converted by a message server in home network of the sender. Supposing that Zhang San sends a message to his father Zhang Qiang, Zhang San performs the following setting in the message server in home network of the sender: for the emails sent to father, converting the nickname to "son". The whole process includes the procedures as hereinafter.

Step S101: User Zhang San edits the message to be sent on the terminal.

Step S102: The sender terminal sends the message to the message server in home network of the sender, with the message containing the following fields:

From: Zhang San < zhangsan@kkk.com.cn>, and
To: Father <zhangqiang@xxx.com.cn>.

Step S103: After receiving the message, the message server in home network of the sender converts the sender information ("From" field) in the message according to the stored nickname conversion table and the recipient information ("To" field). The converted nickname is "son" (the conversion table will be described in detail later); and the converted message includes the following fields:

From: Son <zhangsan@kkk.com.cn>, and
To: Father <zhangqiang@xxx.com.cn>.

Step S104: The message server in home network of the sender sends the converted message to the message server in home network of the recipient.

Step S105: The message server in home network of the recipient sends the received message to the recipient terminal.

Step S106: After receiving the message, the recipient terminal stores the message and makes it viewable to the user. The nickname of the message is displayed as "son".

The message server in home network of the recipient may convert the nickname for the message, for example, Zhang Qiang performs the following setting in the message server in home network of the recipient: for the emails sent from the son Zhang San, converting the nickname to "Xiao San". After receiving the message, the message server in home network of the recipient may convert the nickname and send it to the recipient terminal. The converted message includes the following fields:

From: Xiao San <zhangsan@kkk.com.cn>, and
To: Father <zhangqiang@xxx.com.cn>.

In the previous embodiment, the message server in home network of the recipient terminal may be the same as the message server in home network of the sender terminal, and the process of converting the nickname is similar to the previous embodiment.

In the practical application, a terminal may work as both sender terminal and recipient terminal concurrently; a message server may work as a message server in home network of the sender and a message server in home network of the recipient in the previous embodiment concurrently.

In order to implement the previous nickname conversion function, a nickname conversion table is stored in the message server. The specific format of a table comes in many modes. An example of a table is:

each user has a table, called "nickname information table", which contains the converted message address, the nickname upon receiving the message, and the nickname upon sending the message. The meaning of each field is as follows:

converted message address: sender address in the received message, or recipient address in sent message; for different message services, the message address is different, for example, the message address of the email service may be the email address but the message address of the SMS and MMS may be a mobile number, and the message address of the instance message service may be a username;

nickname upon receiving a message: the nickname of the message sender when a message is received by the user from the converted message address; and nickname upon sending a message: the nickname of the message sender when a message is sent from the user to the converted message address.

For the nickname information table, the nickname upon receiving a message and the nickname upon sending a message may coexist, or only one of them exists.

For example, the nickname information table of user Zhang San is shown in Table 1:

TABLE 1

| Converted message address | Nickname upon receiving a message | Nickname upon sending a message |
|---|---|---|
| zhangqiang@xxx.com.cn | Father | Son |
| lisi@yyy.com.cn | Wife | Husband |
| wangwu@zzz.com.cn | Boss | Zhang San |
| liuyi@xxx.gov.cn | Lao Liu | Kid San |
| ... | ... | ... |
| Other address | Default | Zhang San |

In this way, when Zhang San receives a message from his father Zhang Qiang (zhangqiang@xxx.com.cn), the displayed sender is "father". After reading the message, Zhang San replies to Zhang Qiang. Upon receiving the reply, Zhang Qiang sees the sender "Son".

In the message server, another table called "nickname contrast table" is created, and includes: message address of the user and corresponding nickname information table ID. The meaning of each field is as follows:

message address: message address of the user; and
corresponding nickname information table ID: ID of the nickname information table corresponding to the message address.

One user may have multiple message addresses, which may correspond to the same nickname information table ID. For example, Zhan San has three different message addresses, which correspond to the same nickname information table (Table 1). Table 2 is an example of the nickname contrast table:

TABLE 2

| Message address | Corresponding nickname information table ID |
|---|---|
| zhangsan@xxx.com.cn | Table 1 |
| zhangsan@yyy.com.cn | Table 1 |
| zhangsan@kkk.com.cn | Table 1 |
| wangwu@xxx.com.cn | Table 2 |
| zhaoqi@jjj.com.cn | Table 3 |
| ... | ... |

In the process of receiving a message, after receiving an incoming message, the message server in home network of the recipient finds the corresponding nickname information table according to the recipient address in the nickname contrast table and the "To" field of the message, and then converts the nickname of the sender according to the sender address in the "From" field of the message. The message server sends the converted message to the receiving terminal.

In the process of sending a message, after receiving an outgoing message, the message server in home network of the sender finds the corresponding nickname information table according to the sender address in the nickname contrast table and the "From" field of the message, and then converts the nickname of the sender according to the sender address in the "From" field of the message. The message server sends the converted message to other message servers.

The previous example is implemented through two tables. Alternatively, the two tables may combine into a whole nickname conversion table. The format of the table is not repeated here any further.

It is understandable that the message address is the email address in the examples of Table 1 and Table 2. However, in the practical application, the message address may be an CPM address, SMS address, MMS address or instant message address.

The user may set the message server which is in home network with respect to the nickname conversion table. The setting modes include: sending a message on the terminal, logging into the relevant website, or setting through the interactive voice of the call center. For example, the user may edit a short message in the agreed format through a mobile terminal to implement the functions of adding, deleting, modifying and querying an entry of the nickname conversion table.

Figure 2:
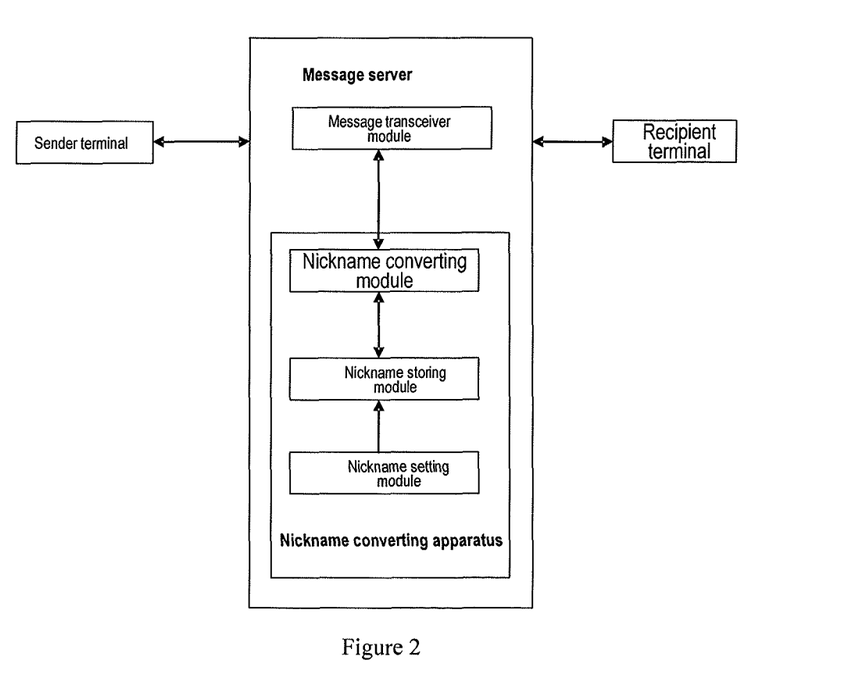
FIG. 2 shows the structure of a nickname conversion apparatus located in a message server in an embodiment of the present disclosure.

FIG. 2 shows the structure of a nickname conversion apparatus for individualizing nicknames located in a message server in a message system. A message server includes:

a message transceiver module, adapted to receive messages convert the nickname through a nickname conversion apparatus, and send the converted message.

A nickname conversion apparatus includes:

a nickname converting module, adapted to convert the nickname for the message according to the nick conversion table stored in a nickname storing module;

the nickname storing module, adapted to store the nickname conversion table; and a nickname setting module, adapted to set the nickname conversion table, including the operations of adding, deleting, modifying and searching.

Figure 3:
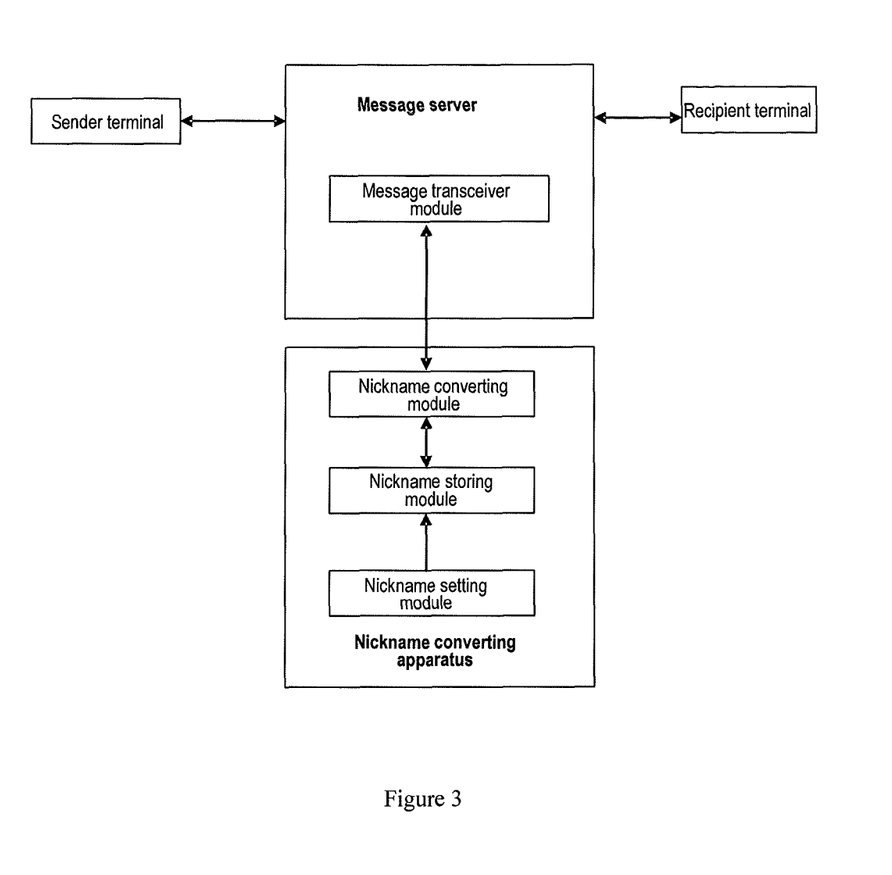
FIG. 3 shows the structure of a nickname conversion apparatus independent of the message server in an embodiment of the present disclosure.

FIG. 3 shows the structure of a nickname conversion apparatus independent of the message server. The functions of each module in the nickname conversion apparatus are the same as illustrated in FIG. 2. The message server sends a message to the nickname conversion apparatus, requesting the nickname conversion apparatus to convert the nickname. The nickname conversion apparatus returns the conversion result to the message server.

FIG. 2 and FIG. 3 show the collective terms of various messages of the message server, which can be used to support various messages such as CPM, SMS, MMS, and instant message. Namely, the message servers include: CPM server, SMS server, MMS server, instant message server, and mobile email server.

Figure 4:
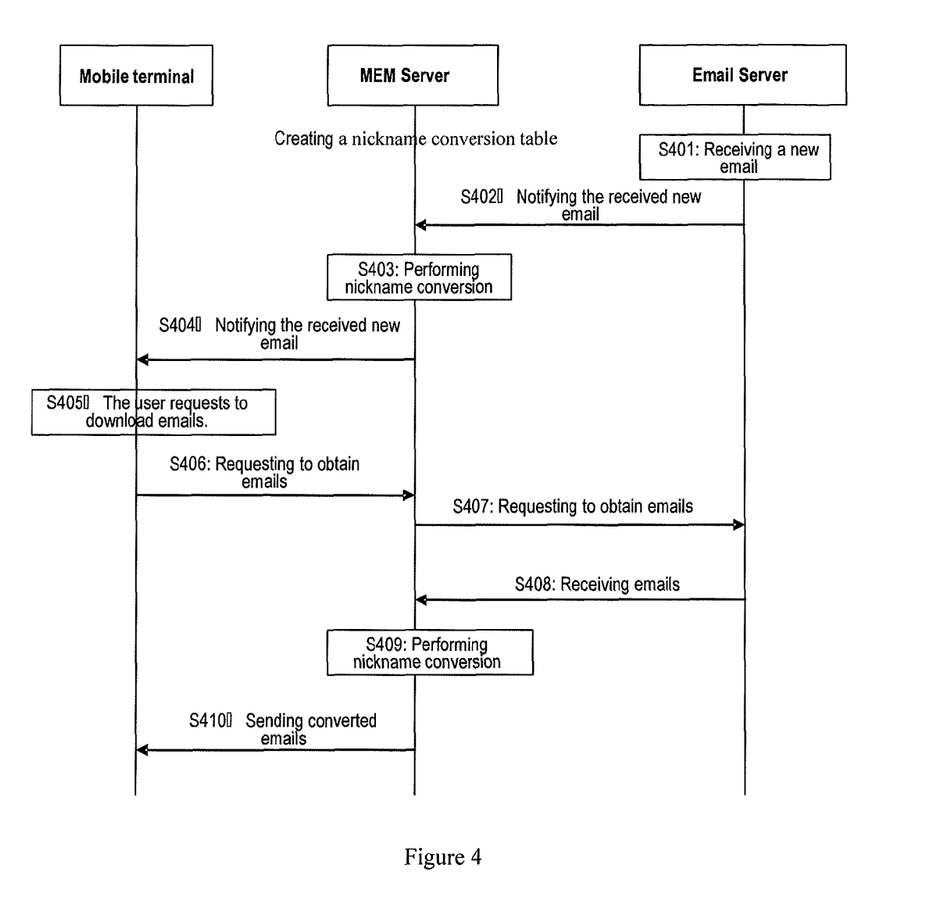
FIG. 4 shows a flowchart of obtaining the emails with converted nicknames and the corresponding notifications in an embodiment of the present disclosure.

FIG. 4 shows how a terminal obtains the emails with converted nicknames and the corresponding notifications. The systems for implementing such a function include: mobile terminal, mobile email server (MEM server), and email server, wherein:

the mobile terminal is adapted to receive and send emails in the man-machine interaction mode. An example of mobile terminals is mobile phone;

the email server undertakes the functions available from a traditional email server, and is responsible for receiving and sending emails;

the MEM server interacts with the email server and performs adaptation and notification for mobile emails.

In this embodiment, the nickname conversion is implemented through an MEM server. The process of converting a nickname through an email server includes the steps as hereinafter, supposing that user Zhang San receives an email from father Zhang Qiang.

Step S401: The email server receives a new email, which includes the following fields:

From: Zhang Qiang <zhangqiang@xxx.com.cn>, and
To: Zhang San <zhangsan@kkk.com.cn>.

Step S402: The email server notifies the MEM server that a new email comes. The email server may notify the MEM server actively, or the MEM server polls the email server to know whether a new email is received. A notification message may contain the brief information of the email such as message identifier, "Subject" field, "From" field, "To" field, and attachment title.

Step S403: After receiving the email notification, the MEM server converts the sender information ("From" field) in the email according to the stored nickname conversion table and the recipient information ("To" field). The converted nickname is "father" (the conversion table will be described in detail later); the MEM server combine the "From" field with the message ID, "Subject" field, "To" field, and attachment title into an email notification. The converted email includes the following fields:

From: Father <zhangqiang@xxx.com.cn>, and
To: Zhang San <zhangsan@kkk.com.cn>.

Step S404: The MEM server sends the email notification to the terminal.

Step S405: The terminal displays the email notification, with the sender nickname displayed as "Father". User Zhang San knows that the email is sent from father, and operates the terminal to download the email.

Step S406: The terminal requests the MEM server to obtain the email, with the email identifier carried in the request.

Step S407: The MEM server forwards a request to the email server.

Step S408: The email server finds the corresponding email according to the email identifier, and sends the email to the MEM server, with the following fields carried in the email:

From: Father <zhangqiang@xxx.com.cn>, and
To: Zhang San <zhangsan@kkk.com.cn>.

Step S409: Like in S103, after receiving the email, the MEM server converts the sender information ("From" field) in the email according to the stored nickname conversion table and the recipient information ("To" field). The converted nickname is "father", as shown below:

From: Father <zhangqiang@xxx.com.cn>, and
To: Zhang San <zhangsan@kkk.com.cn>.

Step S410: The MEM server sends the converted email to the terminal, and the terminal displays the nickname of the email sender as "Father".

Figure 5:
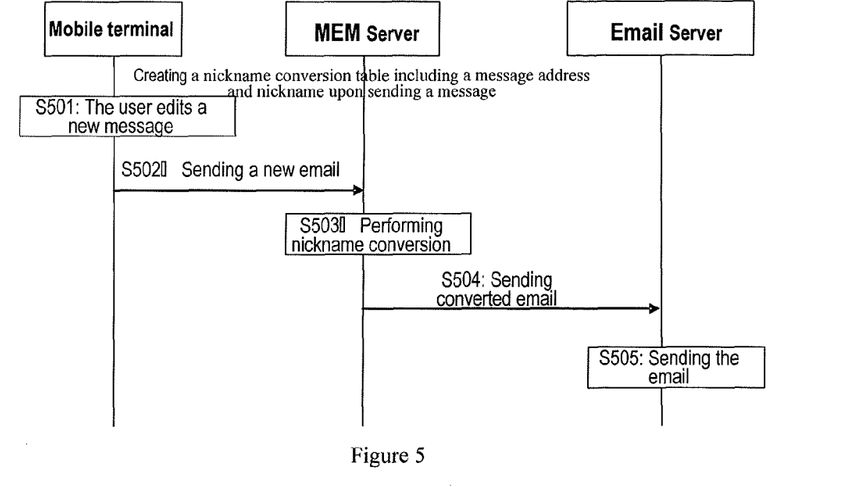
FIG. 5 is a flowchart of setting a nickname when the terminal sends emails in an embodiment of the present disclosure.

FIG. 5 is a flowchart of setting a nickname at the time of sending an email. The nickname conversion is implemented by the MEM server. The process of converting the nickname includes the steps as hereinafter, supposing that Zhang San sends an email to father Zhang San.

Step S501: User Zhang San edits the email to be sent on the terminal.

Step S502: The terminal sends a new email to the MEM server, with the following fields carried in the email:

From: Zhang San < zhangsan@kkk.com.cn>, and
To: Father <zhangqiang@xxx.com.cn>.

Step S503: After receiving the email, the MEM server converts the sender information ("From" field) in the email according to the stored nickname conversion table and the recipient information ("To" field). The converted nickname is "son" (the conversion table will be described in detail later); and the converted email includes the following fields:

From : Son <zhangsan@kkk.com.cn>, and
To: Father <zhangqiang@xxx.com.cn>.

Step S504: The MEM server sends the converted email to the email server.

Step S505: After receiving the email, the email server sends the email to the email box of the destination address.

In order to implement the previous nickname conversion function, a nickname conversion table is stored in the MEM server. The specific format of a table comes in many modes. An example of a table is that:

each user has a table, called "nickname information table", which contains the converted email address, the nickname upon sending the email, and the nickname upon sending the email. The meaning of each field is as follows:

converted email address: sender address in a received email, or recipient address in a sent email;

nickname upon receiving an email: the nickname of the email sender when a email is received from the converted email address; and nickname upon sending an email: the nickname of the email sender when a email is sent to the converted email address.

For a nickname information table, the nickname upon receiving an email and the nickname upon sending an email may coexist, or only one of them exists.

For example, the nickname information table of user Zhang San is shown in Table 3:

TABLE 3

| Converted message address | Nickname upon receiving a message | Nickname upon sending a message |
|---|---|---|
| zhangqiang@xxx.com.cn | Father | Son |
| lisi@yyy.com.cn | Wife | Husband |
| wangwu@zzz.com.cn | Boss | Zhang San |
| liuyi@xxx.gov.cn | Lao Liu | Kid San |
| ... | ... | ... |
| Other address | Default | Zhang San |

In this way, when Zhang San receives an email from his father Zhang Qiang (zhangqiang@xxx.com.cn), the displayed sender is "father". After reading the email, Zhang San replies to Zhang Qiang. Upon receiving the reply, Zhang Qiang sees the sender "Son".

In the MEM server, another table called "nickname contrast table" is created, and includes: email address of the user and corresponding nickname information table ID. The meaning of each field is as follows:

email address: email address of the user; and corresponding nickname information table ID: ID of the nickname information table corresponding to the email address.

One user may have multiple email addresses, which may correspond to the same nickname information table ID. For example, Zhan San has three different email addresses, which correspond to the same nickname information table (Table 3). Table 4 is an example of the nickname contrast table:

TABLE 4

| Email address | Corresponding nickname information table ID |
|---|---|
| zhangsan@xxx.com.cn | Table 1 |
| zhangsan@yyy.com.cn | Table 1 |
| zhangsan@kkk.com.cn | Table 1 |
| wangwu@xxx.com.cn | Table 2 |
| zhaoqi@jjj.com.cn | Table 3 |
| ... | ... |

In the process of receiving an email, after receiving an incoming email, the MEM server finds the corresponding nickname information table according to the recipient address in the nickname contrast table and the "To" field of the email, and then converts the nickname of the sender according to the sender address in the "From" field of the email. The MEM server sends the converted email to the terminal.

In the process of sending an email, after receiving an email from the terminal, the MEM server finds the corresponding nickname information table according to the sender address in the nickname contrast table and the "From" field of the email, and then converts the nickname of the sender according to the sender address in the "From" field of the email. The MEM server sends the converted email to the email server.

The previous example is implemented through two tables. Alternatively, the two tables may combine into a whole nickname conversion table. The format of the table is not repeated here any further.

The user may set the nickname conversion table. The setting modes include: sending a message on the terminal, logging into the relevant website, or setting through the interactive voice of the call center. For example, the user may edit a short message in the agreed format through a mobile terminal to implement the functions of adding, deleting, modifying and querying an entry of the nickname conversion table.

Figure 6:
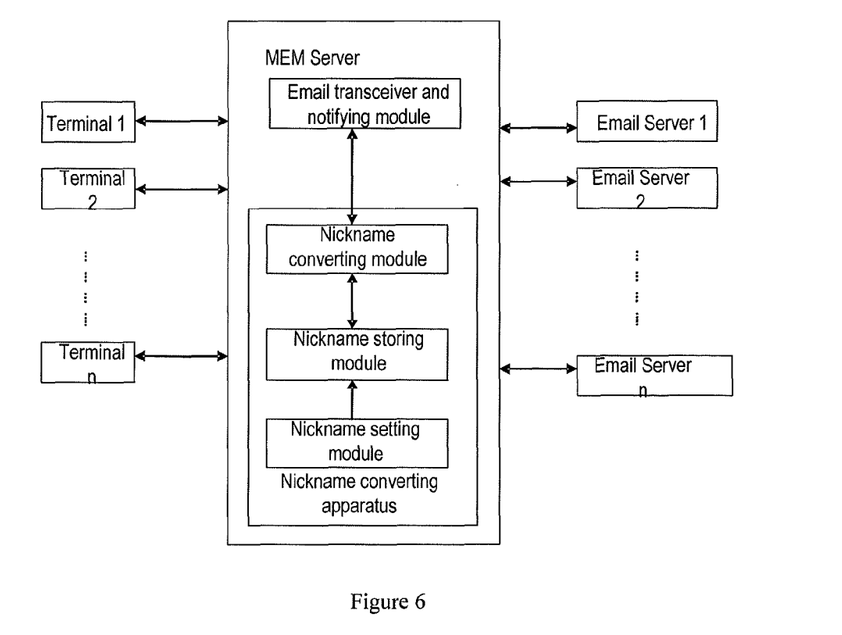
FIG. 6 shows the structure of a nickname conversion apparatus located in an MEM server in an embodiment of the present disclosure.

FIG. 6 shows the structure of a nickname conversion apparatus for individualizing nicknames located in a MEM server. An MEM server includes:

an email transceiver and notifying module, adapted to: receive an email sent from the mobile terminal, and send the email with a converted nickname to the email server; receive an email from the email server, and send the email with a converted nickname to the mobile terminal; receive an email from an email server, and send an email notification with a converted nickname to the mobile terminal, wherein the nickname conversion is performed through a nickname conversion apparatus.

A nickname conversion apparatus includes:

a nickname converting module, adapted to convert the nickname for the email and the email notification according to the nick conversion table stored in a nickname storing module;

the nickname storing module, adapted to store the nickname conversion table; and a nickname setting module, adapted to set the nickname conversion table, including the operations of adding, deleting, modifying and searching.

Figure 7:
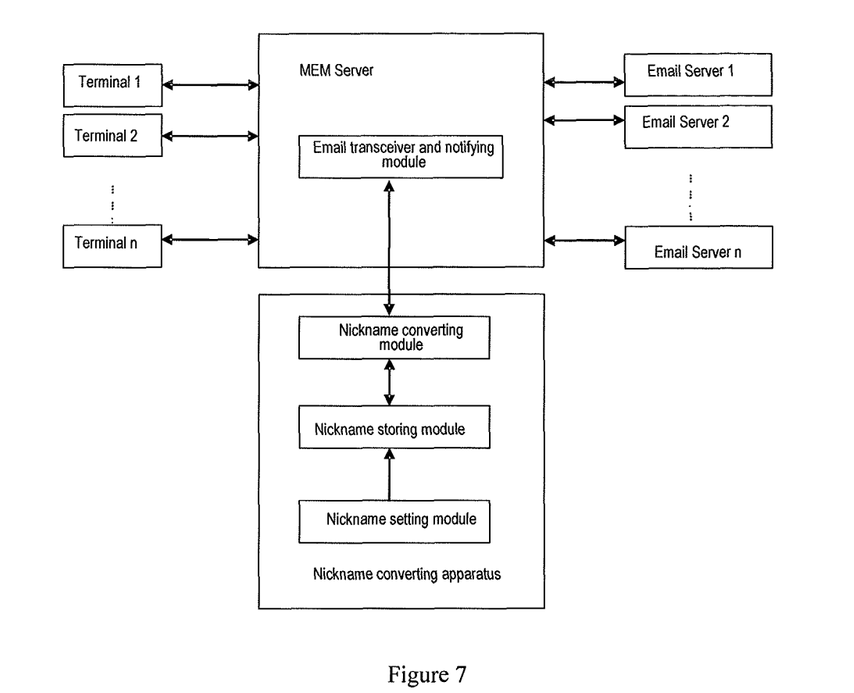
FIG. 7 shows the structure of a nickname conversion apparatus independent of the MEM server in an embodiment of the present disclosure.

FIG. 7 shows the structure of a nickname conversion apparatus independent of the MEM server. The functions of each module in the nickname conversion apparatus are the same as illustrated in FIG. 6. The MEM server sends a message to the nickname conversion apparatus, requesting the nickname conversion apparatus to convert the nickname. The nickname conversion apparatus returns the conversion result to the MEM server.

The nickname setting module in all nickname conversion apparatuses mentioned above is not mandatory.

A message server provided in an embodiment includes:

a message transceiver module, adapted to receive a message, transfer the received message to the nickname conversion apparatus; receive the converted message returned by a nickname conversion apparatus, and send the converted message; and the nickname conversion apparatus, adapted to convert the nickname for the received message, and return the converted message to the message transceiver module.

The nickname conversion apparatus is further adapted to receive the nickname setting information and set the nickname conversion table, including the operations of adding, deleting, modifying and searching.

The message servers may be CPM server, SMS server, MMS server, instant message server, or mobile email server.

The nickname conversion apparatus shown in FIGS. 2, 3, 6 and 7 are located at the network side. It is understandable that the nickname conversion apparatus may be located at the terminal side.

Figure 8:
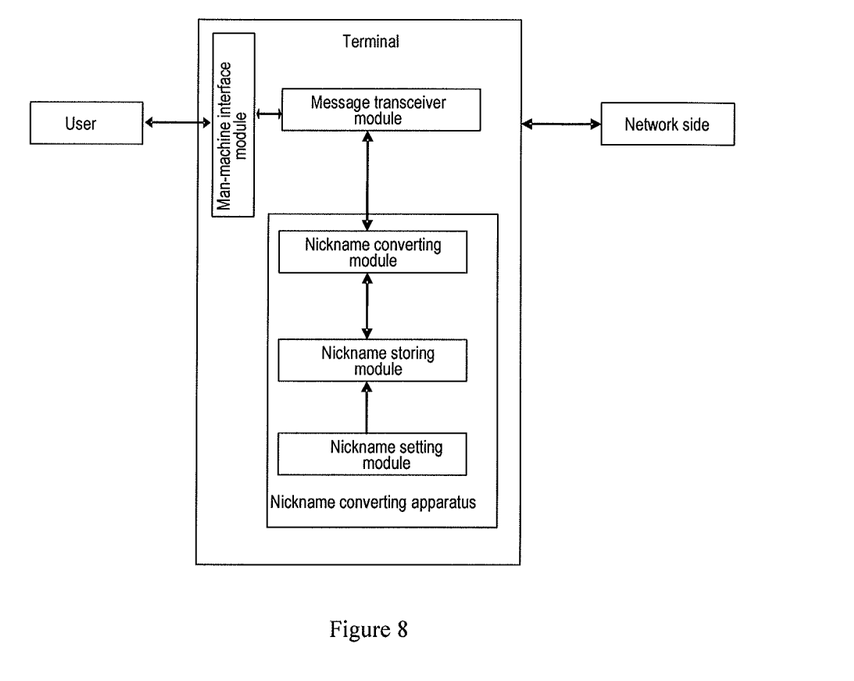
FIG. 8 shows the structure of a nickname conversion apparatus located in a terminal in an embodiment of the present disclosure.

As shown in FIG. 8, a terminal disclosed in an embodiment includes:
- a message transceiver module, adapted to receive a message, transfer the received message to a nickname conversion apparatus; receive the converted message returned by the nickname conversion apparatus, and send the converted message;
- the nickname conversion apparatus, adapted to convert the nickname for the received message, and return the converted message to the message transceiver module; and
- a man-machine interface module, adapted to transfer the message input by the user to the message receiving & sending module, and display the message received from the message receiving & sending module to the user.

The nickname conversion apparatus is further adapted to receive the nickname setting information and set the nickname conversion table, including the operations of adding, deleting, modifying and searching.

The structure of the nickname conversion apparatus in the previous terminal is the same as that shown in FIGS. 2, 3, 6 and 7, and is not repeated here any further.

Therefore, the present invention enables the user to individualize the nickname information, and display different sender nicknames to different recipients; if being stored in a server, the nickname information is secure and reliable, and can be uniformly shared by multiple terminals of the user.

Although the invention has been described through some exemplary embodiments, the invention is not limited to such embodiments. It is apparent that those skilled in the art can make various modifications and variations to the present invention without departing from the spirit and scope of the present invention. The present invention is intended to cover these modifications and variations provided that they fall in the scope of protection defined by the following claims or their equivalents.

What is claimed is:

1. A method for individualizing message nicknames, comprising:
   creating a nickname conversion table of a user, by an apparatus for individualizing message nicknames, where the content of the nickname conversion table is set by the user, and the nickname conversion table contains at least one entry, where each of the entry comprises a message address of a recipient, a nickname upon receiving the email, and a nickname upon sending a message corresponding to the message address of the recipient; where the nickname upon receiving an email means a nickname of the email sender when an email is received from the converted email address, and where the nickname upon sending a message means the nickname of the message sender when a message is sent from the user to the message address;
   receiving a message, which is going to be sent to the message address from the user, where the message is created by the user and wherein the message corresponds to Converged IP Message (CPM), Short Message Service (SMS), Multimedia Short message (MMS), email, and instant messages;
   converting a sender name in the message to the nickname upon sending a message according to the nickname conversion table and the message address of the recipient; and
   sending the message with the converted sender name out.

2. The method of claim 1, wherein contents of the nickname conversion table are set during modes of operation consisting essentially of: sending a message on the terminal, logging into the relevant website, and setting through the interactive voice of the call center.

3. A computer program product stored on a non-transitory computer readable storage medium with computer executable instructions that when executed in an apparatus for individualizing message nicknames by performing the following:
   store a nickname conversion table of a user, where the content of the nickname conversion table is set by the user, and the nickname conversion table contains at least one entry, where each of the entry comprises a message address of a recipient, a nickname upon receiving the email, and a nickname upon sending a message corresponding to the message address of the recipient; where the nickname upon receiving an email means a nickname of the email sender when an email is received from the converted email address, and where the nickname upon sending a message means the nickname of the message sender when a message is sent from the user to the message address; and
   receive a message which is going to be sent by the user to the message address, where the message is created by the user and wherein the message corresponds to Converged IP Message (CPM), Short Message Service (SMS), Multimedia Short message (MMS), an email, and instant messages;
   converting a sender name in the message to the nickname upon sending a message according to the nickname conversion table and the message address of the recipient; and
   sending the message with the converted sender name out.

4. The computer program product of claim 3, further comprising:
   receive nickname setting information, and set the nickname conversion table, wherein the setting the nickname conversion table includes at least one of: adding, deleting, modifying, and searching operations.

5. The computer program product of claim 3, wherein the apparatus for individualizing message nicknames is located in at least one of: a physical entity that includes a message server, and a stand-alone physical entity.

6. The computer program product of claim 3, wherein the apparatus is located at one of: a network side, and a terminal side.

* * * * *